United States Patent Office
3,247,665
Patented Apr. 26, 1966

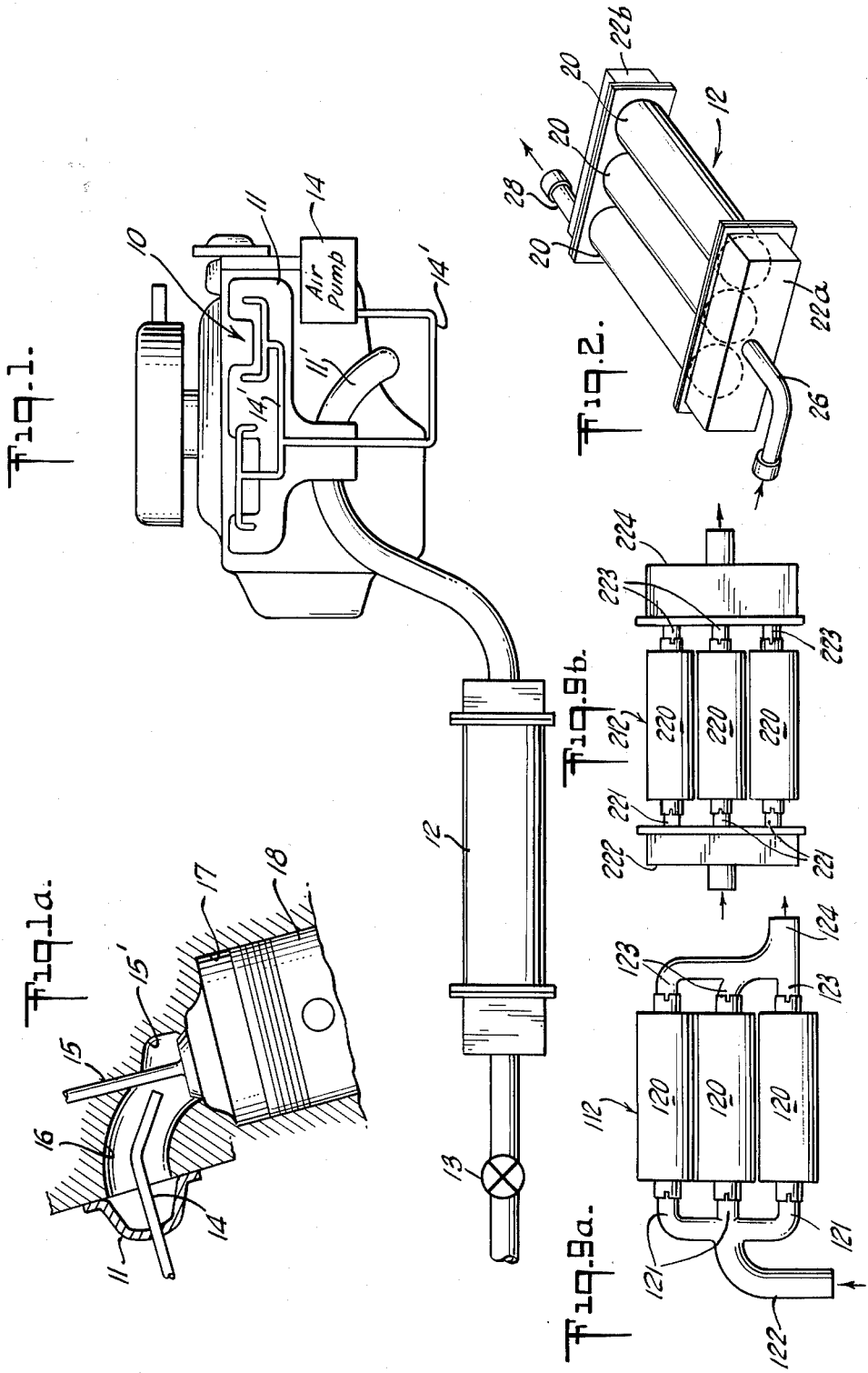

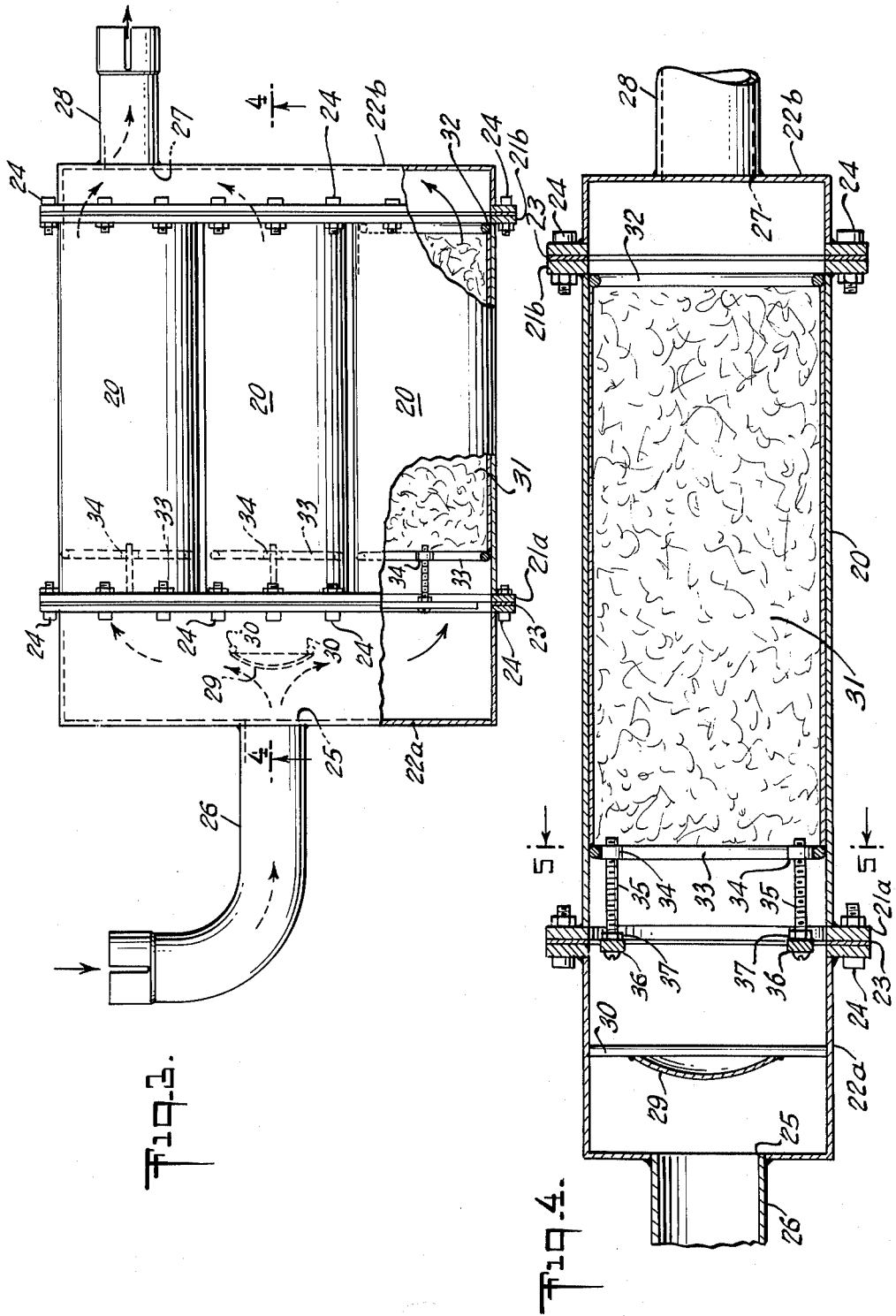

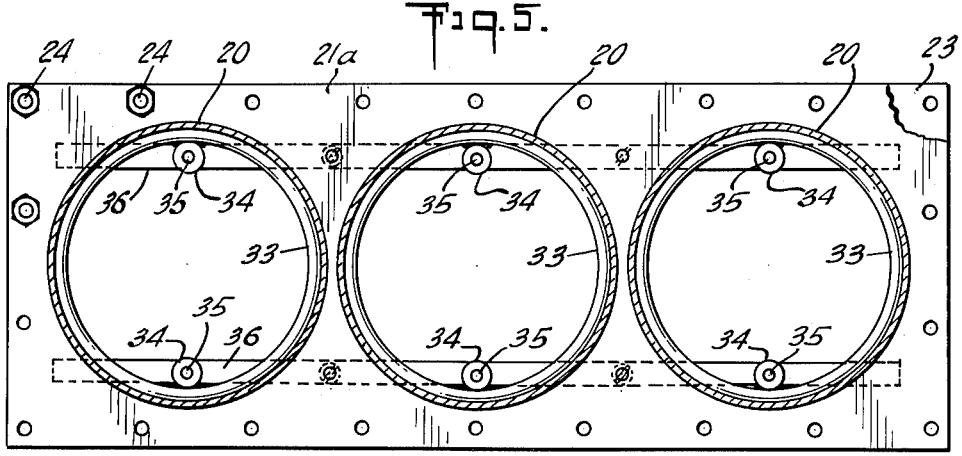
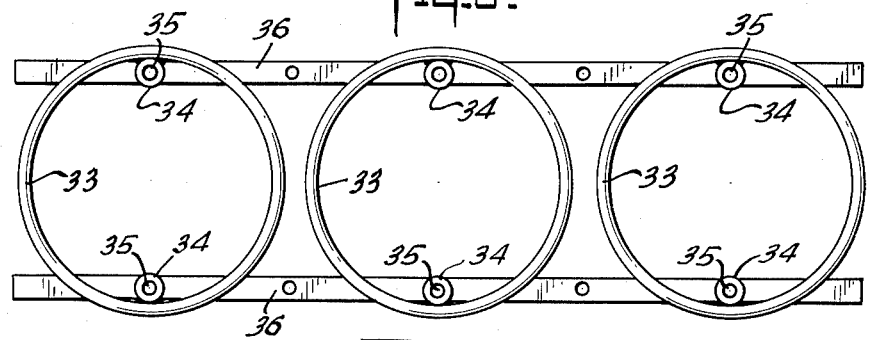
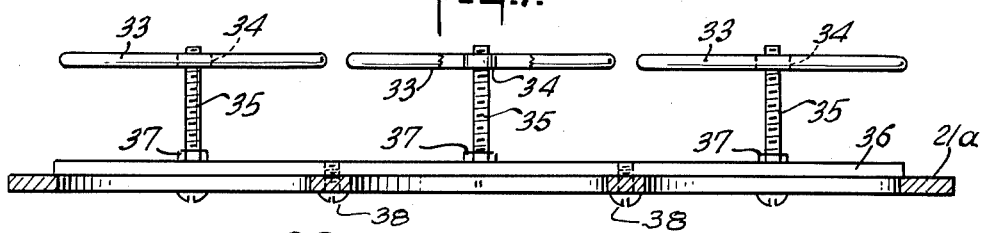
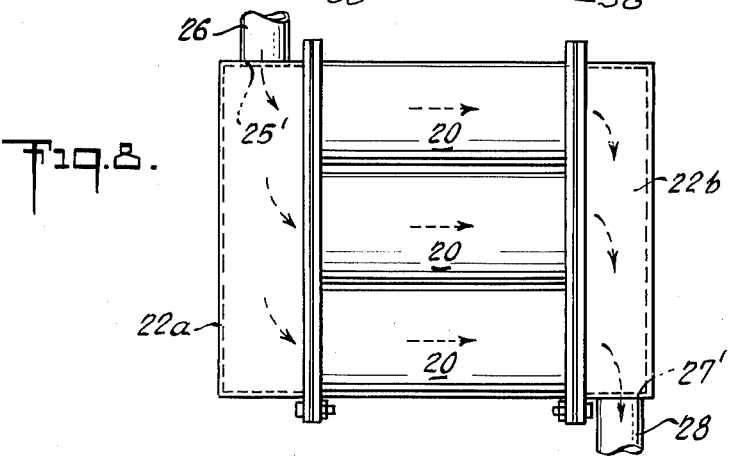

3,247,665
CATALYTIC MUFFLER CONSTRUCTION FOR EXHAUST EMISSION CONTROL IN AN INTERNAL COMBUSTION ENGINE SYSTEM
Milton D. Behrens, Hopewell Junction, N.Y., assignor to Texaco Inc., New York, N.Y., a corporation of Delaware
Filed Apr. 2, 1964, Ser. No. 356,797
11 Claims. (Cl. 60—30)

This invention relates generally to the operation of internal combustion engines, and in one specific embodiment, to an apparatus for the control of exhaust emissions therefrom by eliminating combustible and lead compounds from the products of combustion of an internal combustion engine.

Internal combustion engines generally operate at fuel-air mixtures which are richer than stoichiometric, with the result that in the exhaust products of combustion, there are considerable residual combustible compounds including carbon monoxide, hydrogen and hydrocarbons. For automotive exhaust emissions control, it is known that additional air should be added to such exhaust products to produce an overall fuel-air ratio in the exhaust system at least stoichiometric and preferably slightly leaner, and means must be provided for promoting the reaction of the combustible compounds in the exhaust with air to the eventual end products of water and carbon dioxide.

The introduction of air as an oxidizing fluid into the exhaust manifolds of internal combustion engines to convert the carbon monoxide in the engine exhaust products to carbon dioxide is known in the art. Such an oxidizing fluid is introduced adjacent the downstream face of the exhaust valve, where the temperature is sufficiently high so that further combustion can occur spontaneously. Means are also known for mixing and reacting additional air with the combustible compounds in the exhaust products in the form of catalytic reactors.

In order to increase the octane rating of motor fuels, an organic lead compound, such as tetraethyllead, is added. Some lead compounds contained in the exhaust products from an engine operated on such fuels adversely affect many oxidation catalysts which might be employed in exhaust systems, thereby decreasing the activity of the catalysts in a relatively short period of time.

Accordingly, it is an object of my invention to provide an improved means for greatly reducing, if not eliminating for all practical purposes, combustible compounds in the exhaust products of combustion from an internal combustion engine.

It is another object of my invention to provide a catalytic muffler construction which is capable of operating effectively for long periods of time on exhaust gases containing lead compounds resulting from combustion of fuels containing lead anti-knock compounds.

Still another object of this invention is to provide an improved apparatus for the substantially complete oxidation of the combustible compounds in the exhaust gases, in combination with the removal of lead compounds therefrom.

Still another object of my invention is to provide a simple but effective muffler for an automatic exhaust emissions control system in an internal combustion engine for the exhaust products of combustion thereof.

These and other objects, features and advantages of the invention will become apparent from the following description and claims, when read in conjunction with the accompanying drawings wherein:

FIG. 1 is a diagrammatic showing of an internal combustion engine employing my invention;
FIG. 1a is a way of providing additional air adjacent and downstream an exhaust port;
FIG. 2 is an isometric showing of my improved catalytic muffler construction;
FIG. 3 is a plan view, partly in section, of the catalytic muffler construction, for through flow of gases;
FIG. 4 is a cross section view of the muffler construction, taken along line 4—4 of FIG. 3;
FIG. 5 is a cross section view of the muffler construction, taken along line 5—5 of FIG. 4;
FIG. 6 is a detail of the optional catalytic structure retainer used in the chambers of the muffler;
FIG. 7 is a top plan view of the optional retainer of FIG. 6, showing the header plate in section;
FIG. 8 is a modification of the three chamber muffler construction of FIG. 1, for cross-flow of gases; and
FIGS. 9a and 9b are additional modifications of the through flow catalytic muffler construction.

The objects of my invention are achieved by introducing additional air into the exhaust gases of an internal combustion engine for further reaction with the products of combustion exhausted therefrom and promoting the reaction of air and the residual combustibles therein and removing other undesirables by using a novel catalytic muffler construction.

An engine driven pump has been found feasible for providing additional air to the engine exhaust system. The additional air and exhaust products of combustion are delivered to a chamber where their mixing and combustion occur. In non-catalytic combustion types, such a chamber is known as a direct flame afterburner where ignition is initiated by positive means, such as a glow plug or a spark plug.

Catalytic reaction chambers or reactors are characterized by the features that (a) a catalyst is impregnated on a ceramic or refractory base in the form of bricks, spheres, pellets or porous material, and (b) the exhaust gases plus additional air to complete the combustion thereof are introduced into the reaction chamber packed with the catalyst for mixing and reacting as they pass over and through the catalyst bed.

The principal advantages of the catalytic reactor over the direct flame afterburner are the lower reaction temperatures (600–1000° F. as against 1400° F. and higher) and the elimination of the extra fuel consumption. Some disadvantages are that the typical catalytic reactor is large and with a large thermal mass, a relatively long time of start-up operation is needed to warm up the catalyst to its activation temperature; and while some catalysts may resist lead poisoning, they tend to break up and become ineffective because of combined thermal and mechanical shock from "stop and go" driving and fluctuating load characteristics of automotive service, and from pulsating gas flow and mechanically induced vibrations. Also, deposits from the products of combustion may coat the catalyst and so impair its action.

Referring to FIG. 1 of the drawings, there is disclosed the general showing of an apparatus or engine system wherein the invention is used, consisting basically of an internal combustion engine at 10, with an exhaust system including an exhaust manifold at 11, leading to a catalytic muffler indicated at 12. There is disclosed at 13, a diagrammatic showing of a valve for regulating exhaust back pressure, shown located downstream of the catalytic muffler. The location of this valve is determined in accordance with the design characteristics of the engine employing my invention, in order that proper afterburning may be completed in the exhaust system. At 14, there is disclosed an engine driven air pump for providing additional air to the exhaust system of the engine, in the manner shown specifically in FIG. 1a, through inlet tubing 14'. When delivery characteristics are adequate, an exhaust driven turbine super-charger may be used to supply the additional air. Other means for introducing additional air into the exhaust system adjacent an exhaust port are available.

As known in the art, additional air is provided adjacent the downstream face of the exhaust valve 15, FIG. 1a, which closes the exhaust port at 15' in the cylinder head 16 of an internal combustion engine, having a cylinder located at 17 and a piston therein at 18. It is evident that with the inlet tubing 14' passing through the exhaust manifold indicated at 11, there is some preheating of the additional air. Preheating of the additional air may be accomplished in other ways, e.g. by cooling of engine locations subject to overheating, and could be used when engine characteristics suggest that the additional air be introduced at higher than ambient temperatures. The exhaust pipe at 11', FIG. 1, leads from the exhaust manifold of the other bank of engine cylinders, as in the case of V-type engines, and brings along the exhaust gases and additional air in various stages of reaction.

In the area of air introduction, the temperatures of the exhaust gases vary from 1400° F. to 2400° F., depending upon engine operating conditions, so that in the presence of additional air, the combustible compounds in the products of combustion can ignite spontaneously. At low and medium load conditions, it has been found that to promote a more complete combustion of the residual combustibles, additional back pressure must be imposed on the gases in the exhaust system in addition to that imposed by the conventional muffler and/or catalytic reactor construction. Normally, the exhaust back pressure imposed by the conventional muffler structure at engine idling conditions may amount to approximately 0.5 p.s.i., and under conditions of wide open throttle operation (at approximately 70 m.p.h., and higher) may amount generally to as much as 10 p.s.i., due largely to the large mass volume of gases, as well as to their inertia, passing through the muffler.

In my copending and coassigned application for patent, Ser. No. 335,122, filed January 2, 1964, the disclosure of which is incorporated herein by this reference, the introduction of additional air and the raising of the exhaust back pressure to further the reaction with the exhaust products of combustion is set forth. Therein is disclosed that to achieve the improved afterburning conditions, as a generalization, the excess back pressure should be greater than that imposed by the ordinary muffler construction, and should be greater than 1.05 times the atmospheric pressure to attain at least minimum control standards of reduction of hydrocarbon content. The slight power loss incurred because of the elevated back pressure is more than compensated for by increases in fuel economy which accrue from the use of additional air at the exhaust port plus an elevated exhaust back pressure.

Presently, certain requirements for reducing pollutants contributing to air pollution include that the hydrocarbon content of the average automotive exhaust gases be cut 80% from 1,375 to 275 p.p.m., and carbon monoxide content from 3.8% to 1.5%. It is known also that in the after-burning process, the carbon monoxide and hydrogen in the exhaust products of combustion are oxidized usually prior to the hydrocarbons. To meet a present statutory requirement for reduction of hydrocarbon pollutants by 80%, it is found that the exhaust pressure ratio is about 1.1 or roughly, that the excess back pressure should be about ⅛ greater than the atmospheric pressure. The percent reduction is a function of the original quantity of pollutants in the products of combustion, depending on the fuel-air mixture, e.g., for an engine running on a lean mixture, only a 30–40% reduction may be necessary. If only the minimum statutory requirement limit of 275 p.p.m. of hydrocarbons were desired to be met, an exhaust pressure ratio of 1.05 will be sufficient.

Further, there is disclosed in my above cited copending application for patent that with the use of elevated exhaust back pressure in promoting the exhaust system afterburning reaction, with the addition of air, the ratio of the actual fuel-air mixture to the stoichiometric fuel-air mixture, being indicated as $\gamma$, varies from about 0.85 to about 1.25. The addition of air is continuous and is provided the exhaust system at a pressure sufficient for free flow thereto. Too great an amount of additional air leads to lowering of the temperature in the exhaust system so that the extent of additional burning is decreased and the cost of pumping is increased. When necessary, the additional air can be preheated, too.

While the content of the combustible compounds in the exhaust products of combustion can be removed satisfactorily to meet the minimum conditions set by certain present ordinances, it is possible to reduce further the unburned hydrocarbons by the use of a catalyst positioned in or adjacent the muffler for a further afterburning reaction. Such a catalyst could provide not only for the reduction of the hydrocarbon content but also control the amounts of other gases, such as the oxides of nitrogen, which are included in the noxious materials leaving the exhaust system after-burning reaction. After the introduction of additional air into the exhaust system adjacent an exhaust port, the elevated temperature following the combustion reaction in the exhaust system permits the amount of catalyst required in the reactor to be reduced, and because of the increased temperature of the exhaust gases, the load on the catalyst in the reactor is reduced also. To achieve such results, FIG. 1 discloses diagrammatically a basic structure by which the exhaust back pressure is maintained at the required level to promote the exhaust system afterburning, with the valve at 13 to control the back pressure on the exhaust gases flowing through the catalytic muffler at 12.

The catalytic muffler is connected to the exhaust pipe leading from the exhaust manifold 11 as close as possible to the engine exhaust in order to take advantage of the higher temperature of the exhaust gases in this region, for better catalytic reaction. The construction of the catalytic muffler can be such so that not only does the catalyst serve as a muffler but also provides sufficient resistance to gas flow to raise the exhaust back pressure and might eliminate the need for a back pressure valve, depending upon the normal schedule of engine operations.

Specific valve constructions to maintain proper back pressure conditions in the exhaust system are disclosed also in my above cited copending application for patent.

Referring now to FIGS. 2, 3 and 4, the catalytic muffler construction, shown generally at 12, comprises a plurality of cylindrical chambers 20, shown for purposes of illustration as three in number, joined integrally to upstream and downstream headers 21a and 21b respectively, to form a unitary structure. These headers are fastened respectively to entrance and exit manifolds 22a and 22b, with gasket 23 therebetween, by removable members 24, such as nuts and bolts. The entrance manifold 22a has a centrally located opening at 25 on its upstream face, for receiving a discharge pipe 26 from the automotive exhaust manifold system, while exit manifold 22b is shown as having a corresponding opening at 27, spaced off center on the downstream face of the exit manifold, from which discharge pipe 28 extends. Alternatively, the opening 27 may be located centrally in the downstream face in a position similar to that of opening 25.

Opposite the opening 25 in the entrance manifold, a diffusing baffle 29 is supported, this baffle being shown as partially spherical, although other shapes are acceptable, e.g. conical, in order that the incoming exhaust gases may be distributed to all the chambers of the muffler in a uniform manner. Rods 30 joined at their ends to opposite faces of the entrance manifold support the baffle. This entrance and exit arrangement permits substantially through flow of exhaust gases, contrasted with the modification shown in FIG. 8, where the intake opening 25' is in one of the end faces of the entrance manifold for receiving the discharge pipe from the exhaust system, while the discharge opening 27' is shown in an end face of the exit manifold opposite that for 25', thus providing for cross flow of the exhaust gases through the chambers of the catalytic muffler.

Referring now specifically to FIGS. 4 to 7 inclusive, a catalyst structure is shown for illustration as provided in the form of a cartridge 31 for each chamber of the muffler, held in position therein by the stop ring 32, fastened internally at the downstream end of each cylindrical chamber, and by the adjustable locating ring 33 positioned adjacent the upstream end of each cylindrical chamber.

Each locating ring has a pair of bosses 34 fastened diametrically opposite each other for receiving screw thread means such as a machine screw 35. These machine screws are supported by rods 36, to which they are locked by nuts 37, the rods 36 being fastened to the header 21a by screw means 38. Rotation of the machine screws 35 will position the locating rings 33 at the proper distances for holding the catalyst structure or cartridge in the chamber.

The catalyst structure 31 is formed from a substrate comprising an aggregate of stainless steel wool preferably. As desired, metal knitted mesh or screen or various combinations of metal fibers in the form of filaments, wires, rods, or the like, may be disposed randomly in woven, knit, wound, interlaced, bundled, baled or wrapped forms. Woven metal fabric, e.g., stainless steel screen, may be employed to hold stainless steel wool or knit mesh in a desired shaped form, e.g., in cylindrical form, and may be spirally or concentrically disposed therein. The catalytic carrier may be encased in or surrounded by a metal casing, e.g., sheet metal, to form a cartridge, open at both ends and which may be perforate or imperforate. One or more cartridges may be used in each chamber and each cartridge may contain one or more catalyst structures.

In a preferred embodiment, the substrate of the catalyst structure is made up of coarse grade stainless steel wool, e.g., steel wool having a fiber thickness of 4 to 7 mils and width of 8 to 12 mils, encased in an imperforate cylindrical metal casing open at both ends for longitudinal flow of gases therethrough, as in FIG. 4.

The substrate, formed of a metal or non-metal of sufficient strength and mechanical stability for use in a catalytic reactor, may include steel, stainless steel, aluminum, copper, nickel and titanium, including sintered metal materials, and refractory or ceramic materials including high melting glass, refractory metal oxides, e.g., magnesia and silica, and refractory metal silicates and carbides. A metal substrate is particularly advantageous in that metals are characterized by relatively high thermal conductivity. During the catalytic oxidation of exhaust gases, heat transfer from the catalyst structure is accomplished readily by means of the extended metal substrate. During the initial starting period when the operating temperature is low, heat is conducted throughout the catalyst structure thereby bringing the structure up to operating temperatures. On the other hand, when the temperature is high, heat transfer rates are greater and the metal substrate will conduct the heat to the surroundings thereby facilitating dissipation of heat. Thus, the metal substrate provides an adequate means for controlling the temperature conditions in the catalyst structure.

Suitable catalysts for the treatment of exhaust gases are disclosed in the copending and coassigned applications of John T. Brandenberg and Robert J. Leak, Ser. No. 205,846, filed June 28, 1962, and Ser. No. 251,067, filed January 14, 1963 and the copending and coassigned application of Robert J. Leak, Ser. No. 332,899, filed December 12, 1963, the disclosures of which are incorporated herein by this reference. The novel catalystic structures disclosed in these applications involve broadly a substrate of extended dimensions having an adherent layer of alumina deposited thereon and upon which an oxidation catalyst is deposited in turn. In both of the Brandenberg et al. applications, an additional catalyst is applied in position on the layered substrate ahead of the oxidation catalyst to react with the lead compounds in the engine exhaust gases, in order that the later may become substantially free or depleted in lead compounds prior to contacting a suitable oxidation catalyst, which may be more susceptible to lead poisoning. The removal of lead compounds from the exhaust gases undergoing treatment thus extends the life of the oxidation catalyst substantially.

The substrate is provided with an adherent film of alumina formed by contacting the substrate with a solution of an alkali metal aluminate, e.g. sodium or potassium aluminate, and by proper processing a film of gamma or eta alumina is obtained, which phases of alumina have a large total surface area per unit weight, resulting in a carrier characterized by a high adsorptive property. Preferably, the substrate is encased in its casing prior to coating with the alumina film so that the alumina coats not only the metal fibers, but also coats the casing thereby bonding the metal fibers substrate to the inside wall of the casing. This provides added rigidity to the substrate and prevents blowby of exhaust gases. The alumina coated substrate can then be impregnated with one or more catalysts.

The method utilized in depositing the catalyst material upon the alumina film is dependent to some extent upon the particular catalyst material employed. In one method, the catalyst material is deposited by chemically reducing a solution containing a soluble compound of the catalyst material in the presence of the substrate bearing the alumina film under such conditions as to effect a substantially uniform deposition of the catalyst material upon the alumina surface.

Metals useful in the preparation of the catalyst are those from the group consisting of Group VIII and of Period 4 of the Periodic Table of Elements. The metals from Group VIII include nickel, platinum, iron and cobalt, and combinations thereof, and those metals from Period 4 include copper, vanadium, chromium, manganese, and combinations thereof. The deposited material is generally heated or calcined at a suitable temperature for purposes of conditioning the catalyst. As disclosed in the above cited Leak application for patent, vanadium pentoxide and complexes of copper oxide and copper chromite are useful as catalysts, particularly in combination wherein the exhaust gases first contact the vanadium pentoxide catalyst and then contact the copper oxide-copper chromite catalyst.

In an alternative method, the added oxidation catalyst material may be impregnated on the alumina film by contacting the oxide coated substrate with a solution containing the catalyst material, generally, by immersing the alumina coated substrate in a solution of a salt of the catalyst material.

In still another method, the oxidation catalyst material may be deposited on the alumina film by pasting a slurry of the material, e.g. the oxides of copper, chromium or zinc may be pasted on the alumina coated substrate, and then calcined at a suitable temperature for purposes of conditioning the catalyst.

It should be understood that two or more metal-containing catalyst materials may be deposited on the alumina film, e.g., copper and chromium may be co-deposited from a solution of their nitrate salts. The co-deposits may be then calcined or otherwise activated. In this manner, a co-deposit of copper and chromium results in a catalyst material comprising a copper oxide-copper chromite complex.

In the first of the cited joint coassigned applications for patent, there is disclosed how a phosphorus-containing material may be impregnated on the alumina film by contacting the alumina with a solution containing a compound of phosphorous, usually, by immersing the alumina coated substrate in a solution of salt of the phosphorus-containing material.

The phosphorus compounds found particularly useful include the alkali metal phosphates and the alkaline earth metal phosphates, and more preferably the acid phosphates of these metals which react readily with the lead compounds present in exhaust gases such as sodium dihydrogen phosphate, disodium hydrogen phosphate, sodium phosphate and mixtures thereof, and their alkaline earth counterparts.

The alumina coated substrate having a phosphate deposit thereon is dried in air at a temperature approximating that of an exhaust system of an internal combustion engine for the purpose of conditioning the structure, and the several steps of the process of applying the catalyst are repeated as often as considered necessary, dependent upon the requirements of the engine and the type fuel employed in operating it. Thereafter, as has been disclosed above, an oxidation catalyst material is deposited or impregnated upon the alumina coated substrate, in particular, vanadium pentoxide being preferred.

In the second of the cited joint coassigned applications, there is disclosed that a chromium-containing compound or material may be impregnated on the alumina film by contacting the alumina with a solution containing a compound of chromium, viz. by immersing the alumina coated substrate in a solution of a salt of the chromium-containing compound.

Chromium-containing compounds found useful in the preparation of catalysts include the alkali metal chromates and dichromates and the alkaline earth metal chromates and dichromates, e.g. potassium chromate, potassium dichromate, sodium chromate, sodium dichromate, and their alkaline earth counterparts, e.g., calcium chromate, with potassium chromate being preferred. Also useful are other metal chromates and dichromates such as lead chromate, as well as chromic acid and other trivalent chromium compounds such as chromic oxide, chromic sulfate, chromic nitrate, chromic oxalate, and the like.

As in the case of the phosphate deposit, the alumina coated substrate having a deposit of a chromium-containing material is dried in air at a temperature approximately that of an exhaust system of an internal combustion engine for the purpose of conditioning the structure, and where required, the impregnation step and drying operation may be repeated to assure an adequate deposit of the chromium-containing material dependent upon the requirements of the engine and the type fuel employed in operating it.

Again, as has been disclosed above, an oxidation catalyst material is deposited or impregnated upon the alumina coated substrate, and, as disclosed in the above cited sole coassigned application, vanadium oxide and copper oxide-copper chromite complexes are suitable oxidation catalysts for the treatment of the exhaust gases.

In accordance with an embodiment in which the substrate is a single, substantially continuous unit, the alumina film is formed over the surface of the entire substrate, and then a portion of the alumina film is impregnated with either the phosphate- or chromium-containing material and the remainder of the alumina film is impregnated with oxidation catalyst material. Alternatively, the substrate may be provided in separate sections, each bearing an alumina film. One section is impregnated with either the phosphate- or chromium-containing material, and another section with oxidation catalyst material. As a further modification, a packed column or chamber may be employed with a portion of the packing having alumina formed thereon provided with either the phosphate- or chromium-containing material and the remainder of the packing impregnated with the oxidation catalyst material. The structure is positioned or arranged in the exhaust system of the internal combustion engine such that the exhaust gases emitted therefrom first contact that part of the structure having either the phosphate- or chromium-containing material deposited thereon. Solid and reactive lead compounds in the exhaust gases are removed and retained in the phosphate- or chromium-containing material section. In this manner, harmful lead compounds are removed from the exhaust gases, which are then contacted with the oxidation catalyst to oxidize the combustible compounds. If harmful lead compounds are not removed from the exhaust gases prior to contact with the oxidation catalyst, the oxidation catalyst may be poisoned. Thus, removal of the lead compounds from the exhaust gases by the phosphate- or chromium-containing material extends the life of oxidation catalysts.

As has been disclosed in the second of the cited joint coassigned applications, the copper oxide-copper chromite complexes are useful as an oxidation catalyst alone or in combination with a vanadium oxide oxidation catalyst, in an automotive exhaust system, wherein the catalysts are arranged so that the exhaust gases, preferably following contact with the lead reactive chromium compound, as described above, are brought into contact with the vanadium oxide catalyst and thereafter, into contact with the copper oxide-copper chromite complex catalyst. Vanadium oxide is less susceptible to lead fouling or lead poisoning than the copper oxide-copper chromite complex, but the exhaust gases effluent from the vanadium oxide catalyst contacting step may have a disagreeable odor. The compounds responsible for the disagreeable odor may be converted to low odor compounds by passing the partly treated exhaust gases over the copper oxide-copper chromite catalyst. Other combinations of oxidation catalysts may be used, e.g. vanadium oxide and copper oxide-copper chromite complex catalysts may be deposited or formed on the same section of alumina-coated supporting substrate so that the exhaust gases simultaneously contact both vanadium oxide and the copper oxide-copper chromite complex catalysts.

Preferably one-half to three-fourths of the total catalytic structure is impregnated with one or more of the oxidation catalysts described above and one-fourth to one-half is impregnated with a phosphate- or chromium-containing material as described above to protect the oxidation catalyst from lead poisoning. Ideal limits for the size of the exhaust system for optimum catalytic reaction require that the ratio of the sum of the volume of the catalytic muffler and the volumes of the exhaust passages leading thereto to the engine displacement range from 0.7 to 2.0, and that a suitable range for the volume of catalytic material is from 10 to 16 liters.

The construction of FIG. 8 utilizes the same elements enumerated previously in FIGS. 2 to 4 inclusive, except for the intake and exhaust construction of the inlet and outlet manifolds, and consequently, extensive enumeration has been avoided for purposes of clarity.

FIG. 9a discloses an additonal modification of the catalytic muffler, and comprises a three-barrel construction disclosed generally at 112, consisting of a plurality of easily replaceable catalytic chambers or barrels 120, shown as three in number for purposes of illustration, joined to separate inlets 121 leading from an inlet manifold 122, and to separate outlets 123 leading into the outlet manifold 124. The individual barrels are shown diagrammatically joined to the respective separate inlets and outlets, and in practice, regular muffler fittings are used to provide for easy installation and replacement of the barrels.

FIG. 9b discloses still another modification of a three-barrel catalytic muffler construction disclosed generally at 212, consisting of a plurality of easily replaceable catalytic chambers or barrels 220, again shown as three in number for purposes of illustration, joined to separate inlets 221 leading from an inlet manifold 222, and to separate outlets 223 leading into the outlet manifold 224. Once again, the individual barrels are shown diagrammatically joined to the respective inlets and outlets, with regular muffler fittings being used in practice, for ease in maintenance.

Thus, there has been shown and described, an apparatus by which the amount of pollutant products in the exhaust emissions of an internal combustion engine is reduced in order to comply with air pollution control requirements.

The three barrel muffler is attractive commercially, since it would permit the manufacture of a limited number of types of catalytic cartridges housed in a cylindrical chamber or barrel for use in a wide variety of automobiles. Such chambers could be installed and replaced easily and the salvage value recovered. Further, when the catalyst serves as a lead trap, much of the lead burned in the fuel is retained in the muffler thereby reducing atmospheric lead pollution and ground surface contamination. With little of no attrition of the catalyst caused by vehicle vibration and exhaust gas pulsation, not only is the need for make-up catalyst eliminated, but further pollution of the atmosphere from either catalyst materials or lead compounds adhering to the catalyst surface is prevented.

The combination of air introduction closely adjacent and downstream the exhaust valves, a catalytic muffler structure of relatively lower resistance to higher mass flow rates, and a back pressure regulating valve functioning at the lower speeds above idle to maintain a pressure higher than the normal back pressure of an exhaust system without the back pressure valve and remaining open at the higher speeds and mass flow rates at which the pressure of the exhaust system without the back pressure valve is above the pressure maintained at lower speeds all cooperate to provide a true combination which alone is capable of achieving the required reduction in hydrocarbon and CO emissions over long periods of service, while at the same time providing the rapid warm-up of the catalytic muffler on starting and yet preventing overheating of the catalyst above 1600° F. for any sustained period.

No warm-up period is required for operation of the disclosed automotive exhaust emissions control system as would be required for the critical operation of a catalytic reactor construction, since proper temperature for reaction between the exhaust products and additional air are obtained either at the exhaust ports or in the exhaust system adjacent the catalytic muffler immediately upon starting of the internal combustion engine. The power loss imposed by the increase in exhaust back pressure is at a minimum and as mentioned before, is compensated for by increases in the economy of engine operation with the control construction by the use of leaner fuel-air mixtures. In addition, further fuel economies are available with the use of deceleration or fuel cut off devices, and supplying blowby or crankcase gases to the air pump intake, the latter step aiding in air pollution control, also.

Other modifications and variations of the invention, as hereinbefore set forth, may be made without departing from the spirit and scope thereof, and therefore, only such limitations should be imposed as are indicated in the appended claims.

I claim:

1. In the combination of an internal combustion engine having a cylinder with means for reducing the amount of pollutants including residual combustibles in the exhaust emissions from said cylinder comprising an exhaust system leading from an exhaust port of said cylinder, means for providing air in at least stoichiometric ratio adjacent and downstream of said exhaust port for combustion of said residual combustibles among said exhaust emissions in said exhaust system, and means for controlling the back pressure in said exhaust system comprising valve means positioned therein downstream from said exhaust port functioning to restrict mass flow at the lower engine speeds above idle thereby to maintain a back pressure higher than the normal back pressure of said exhaust system without said valve means and opening at the higher speeds and mass flow rates when said normal back pressure without said valve means is above the imposed back pressure, a catalytic muffler construction located upstream and adjacent said valve means and having a volume greater than that of the normal muffler construction so that the volume ratio of the sum of the volumes of said muffler construction and the exhaust passages leading to said construction to the engine displacement is in the range of from 0.7 to 2.0, said catalytic muffler construction comprising an inlet manifold, an outlet manifold and a plurality of chambers interconnecting the manifolds, said chambers being provided with a catalyst material for reducing the amount of pollutants in said exhaust emissions from said cylinder.

2. In the combination as defined in claim 1, said inlet manifold of said catalytic muffler construction having an inlet for said exhaust emissions and said outlet manifold thereof having an outlet therefrom and both being located for through-flow of said exhaust emissions through said muffler construction, and a deflector positioned opposite said inlet whereby the entering exhaust emissions are deflected and said inlet manifold functions as a surge and mixing chamber.

3. In the combination as defined in claim 1, said inlet manifold and said outlet manifold of said catalytic muffler construction respectively having an inlet and an outlet positioned to provide cross-flow of said exhaust emissions through said muffler.

4. In the combination as defined in claim 1, each of said chambers of said catalytic muffler construction being easily replaceable and provided adjacent the inlet thereto with a catalyst material to remove lead components from said exhaust emissions, and the remainder of each of said chambers being provided with an oxidation catalyst material.

5. In the combination as defined in claim 1, said catalyst material in said chambers of said catalytic muffler construction comprising a substrate with an adherent film of alumina and an oxidation catalyst adherent thereon, said oxidation catalyst being selected from metals from the group consisting of Group VIII and Period 4 of the Periodic Table of Elements.

6. In the combination as defined in claim 5, said oxidation catalyst in said catalytic muffler construction comprising vanadium oxide.

7. In the combination as defined in claim 5, said oxidation catalyst in said catalytic muffler construction comprising a copper oxide-copper chromite complex.

8. In the combination as defined in claim 5, said oxidation catalyst in said catalyst muffler construction comprising vanadium oxide deposited on said film of alumina on one portion of said substrate and a copper oxide-copper chromite complex oxidation catalyst deposited on said film of alumina on another portion of said substrate.

9. In the combination as defined in claim 5, said catalyst material in said catalytic muffler construction including a compound capable of reacting with lead compounds and deposited ahead of said oxidation catalyst with respect to the flow of exhaust emissions through said muffler.

10. In the combination as defined in claim 9, said compound of said catalyst material being capable of reacting with lead compounds being selected from the group consisting of a phosphorous-containing compound and a chromium-containing compound.

11. In the combination as defined in claim 10, ¼ to ½ of the alumina coated substrate of said catalyst material in said catalytic muffler construction being impregnated with a compound capable of reacting with lead compounds in the exhaust emissions from said internal combustion engine and ½ to ¾ of said alumina coated substrate being impregnated with oxygen catalyst.

References Cited by the Examiner

UNITED STATES PATENTS

| | | | |
|---|---|---|---|
| 1,465,904 | 8/1923 | Herdle | 60—30 |
| 2,004,865 | 6/1935 | Grison. | |
| 2,263,318 | 11/1941 | Tifft | 60—30 |
| 2,795,488 | 6/1957 | Reitzel et al. | 23—288.3 |
| 2,850,365 | 9/1958 | Adey et al. | 23—288.3 |
| 2,981,057 | 4/1961 | Buttler | 60—29 |
| 3,024,593 | 3/1962 | Houdry. | |
| 3,025,133 | 3/1962 | Robinson et al. | |
| 3,043,095 | 7/1962 | Sturtz | 60—29 |
| 3,061,416 | 10/1962 | Kazokas | 60—30 X |
| 3,065,595 | 11/1962 | Gary | 60—30 |
| 3,083,083 | 3/1963 | Boysen | 23—288.3 |

SAMUEL LEVINE, *Primary Examiner.*

EDGAR W. GEOGHEGAN, *Examiner.*